United States Patent
Shimada (10) Patent No.: US 7,212,557 B2
(45) Date of Patent: May 1, 2007

(54) SEMICONDUCTOR LASER DEVICE AND RADIATION IMAGE READ-OUT METHOD AND APPARATUS

(75) Inventor: Katsumi Shimada, Kanagawa-ken (JP)

(73) Assignee: Fujifilm Corporation, Tokyo (JP)

( * ) Notice: Subject to any disclaimer, the term of this patent is extended or adjusted under 35 U.S.C. 154(b) by 186 days.

(21) Appl. No.: 10/926,018

(22) Filed: Aug. 26, 2004

(65) Prior Publication Data

US 2005/0047462 A1    Mar. 3, 2005

(30) Foreign Application Priority Data

Aug. 27, 2003  (JP)  ............................. 2003/302858

(51) Int. Cl.
*H01S 5/00*   (2006.01)
(52) U.S. Cl. ................ 372/43.01; 372/50.1; 372/50.23
(58) Field of Classification Search ............ 372/43.01, 372/50.1, 50.23; 250/584–586
See application file for complete search history.

(56) References Cited

U.S. PATENT DOCUMENTS

| | | | | |
|---|---|---|---|---|
| 4,922,103 A | | 5/1990 | Kawajiri et al. | |
| 5,761,229 A | * | 6/1998 | Baldwin et al. | 372/31 |
| 5,780,857 A | * | 7/1998 | Harju et al. | 250/458.1 |
| 6,326,636 B1 | * | 12/2001 | Isoda et al. | 250/586 |
| 6,373,074 B1 | * | 4/2002 | Mueller et al. | 250/584 |
| 6,605,820 B2 | * | 8/2003 | Isoda et al. | 250/586 |
| 6,657,653 B2 | * | 12/2003 | Nakatsuka et al. | 347/246 |
| 6,768,129 B2 | * | 7/2004 | Karasawa | 250/584 |
| 2002/0166977 A1 | * | 11/2002 | Kohda et al. | 250/484.4 |
| 2004/0007709 A1 | * | 1/2004 | Kondo | 257/80 |
| 2005/0051746 A1 | * | 3/2005 | Iwabuchi et al. | 250/580 |

* cited by examiner

*Primary Examiner*—Minsun Oh Harvey
*Assistant Examiner*—Delma R. Flores Ruiz
(74) *Attorney, Agent, or Firm*—Sughrue Mion, PLLC (57) ABSTRACT

A semiconductor laser device produces a laser beam, which is adapted to be expanded into a linear laser beam for use as stimulating rays for an image read-out operation for reading out a radiation image having been stored on a stimulable phosphor sheet. The semiconductor laser device comprises a semiconductor laser chip for producing the laser beam, a package for accommodating the semiconductor laser chip therein, and a radiating window, which is fitted to the package and allows the laser beam having been produced by the semiconductor laser chip to pass therethrough. A surface of the radiating window is coated with an anti-reflection film having a reflectivity of at most 1.0% with respect to a wavelength of the laser beam having been produced by the semiconductor laser chip.

12 Claims, 3 Drawing Sheets

SEMICONDUCTOR LASER DEVICE AND RADIATION IMAGE READ-OUT METHOD AND APPARATUS

BACKGROUND OF THE INVENTION

1. Field of the Invention

This invention relates to a semiconductor laser device. This invention particularly relates to a semiconductor laser device for producing a laser beam, which may be utilized as stimulating rays for readout of a radiation image having been stored on a stimulable phosphor sheet. This invention also relates to a radiation image read-out method and apparatus using the semiconductor laser device.

2. Description of the Related Art

It has been proposed to use stimulable phosphors in radiation image recording and reproducing systems. Specifically, a radiation image of an object, such as a human body, is recorded on a stimulable phosphor sheet, which comprises a substrate and a layer of the stimulable phosphor overlaid on the substrate. Stimulating rays are deflected and caused to scan pixels in the radiation image, which has been stored on the stimulable phosphor sheet, one after another. The stimulating rays cause the stimulable phosphor sheet to emit light in proportion to the amount of energy stored thereon during its exposure to the radiation. The light emitted successively from the pixels in the radiation image having been stored on the stimulable phosphor sheet, upon stimulation thereof, is photoelectrically detected and converted into an electric image signal by photoelectric read-out means. The stimulable phosphor sheet, from which the image signal has been detected, is then exposed to erasing light, and radiation energy remaining thereon is thereby released.

As radiation image read-out apparatuses for use in the radiation image recording and reproducing systems described above, besides conventional point scanning types of radiation image read-out apparatuses, line scanning types of radiation image read-out apparatuses have heretofore been used. The line scanning types of radiation image read-out apparatuses have been proposed from the point of view of keeping the emitted light detection time short, reducing the size of the apparatus, and keeping the cost low. With the point scanning types of the radiation image read-out apparatuses, in cases where, for example, a laser beam is utilized as the stimulating rays, the laser beam is radiated out from a semiconductor laser device, and an image of the laser beam is formed on a stimulable phosphor sheet by use of an image forming optical system. Also, the laser beam is caused by a rotating polygon mirror, or the like, to scan in a main scanning direction, and sites (points) on an entire area of a surface of the stimulable phosphor sheet are thus scanned and stimulated successively by a spot of the laser beam. Further, the light, which has been emitted from each of the stimulated sites (points) on the entire area of the surface of the stimulable phosphor sheet, is detected.

With the line scanning types of the radiation image read-out apparatuses, a line light source for irradiating linear stimulating rays onto a stimulable phosphor sheet is utilized as a stimulating ray source, and a line sensor comprising a plurality of photoelectric conversion devices arrayed along the length direction of a linear area of the stimulable phosphor sheet, onto which linear area the stimulating rays are irradiated by the line light source, is utilized as photoelectric read-out means. (The length direction of the linear area of the stimulable phosphor sheet will hereinbelow be referred to as the main scanning direction.) Also, the line scanning types of the radiation image read-out apparatuses comprise scanning means for moving the stimulable phosphor sheet with respect to the line light source and the line sensor and in a direction, which is approximately normal to the main scanning direction. (The direction, which is approximately normal to the main scanning direction, will hereinbelow be referred to as the sub-scanning direction.) (The line scanning types of the radiation image read-out apparatuses are described in, for example, U.S. Pat. No. 4,922,103.) An example of the line light source for irradiating, for example, a linear laser beam as the linear stimulating rays onto the stimulable phosphor sheet comprises a semiconductor laser device and an optical system for expanding the laser beam, which has been radiated out from the semiconductor laser device, into the linear laser beam extending in the main scanning direction on the stimulable phosphor sheet.

In cases where a radiation image having been stored on a stimulable phosphor sheet is read out by use of the line scanning types of the radiation image read-out apparatuses described above, shading compensation is often performed in order to compensate for, for example, nonuniformity in intensity of light irradiated to the stimulable phosphor sheet along the main scanning direction. The shading compensation is performed by use of a shading compensation signal. The shading compensation signal is formed such that a signal having been obtained from operations, wherein radiation is uniformly irradiated to the entire area of the surface of a stimulable phosphor sheet, and wherein energy having thus been stored on the uniformly exposed stimulable phosphor sheet is read out to yield the signal, may be rendered uniform.

Ordinarily, the semiconductor laser devices for producing the laser beam comprise a semiconductor laser chip for producing the laser beam and a combination of a casing and a cap for enclosing the semiconductor laser chip. (The combination of the casing and the cap for enclosing the semiconductor laser chip is referred to as a package.) The package is provided with a radiating window, through which the laser beam is capable of passing. The laser beam having been produced by the semiconductor laser chip passes through the radiating window of the package and is thus radiated out from the package. Such that return light may not impinge upon the semiconductor laser chip, the radiating windows of the semiconductor laser devices are ordinarily coated with an anti-reflection film.

The semiconductor laser devices have heretofore been utilized in various fields. In particular, recently, optical recording media (i.e., optical disks), such as compact disks (CD's), minidisks (MD's), and digital video disks (DVD's), rapidly became popular. The semiconductor laser devices became essential to recording apparatuses for recording digital information on the optical recording media and for reproducing apparatuses for reproducing the digital information from the optical recording media. Also, a wavelength of a produced laser beam, which is utilized in the recording apparatuses and the reproducing apparatuses, varies for different kinds of optical disks. For example, a laser beam having a wavelength of 780 nm is utilized for the reproduction of the digital information from the CD's. Also, a laser beam having a wavelength of 650 nm is utilized for the reproduction of the digital information from the DVD'S. Manufacturers for the semiconductor laser devices produce the semiconductor laser devices for producing laser beams having various different wavelengths in accordance with various different applications. In order for the production cost to be kept low, each of the radiating windows of the packages of the semiconductor laser devices is ordinarily coated with an anti-reflection film, which is capable of coping with laser beams having wavelengths falling within a wide wavelength range, such that the radiating window is capable of being used for various semiconductor laser chips which produce the laser beams having different wavelengths.

Recently, in order for the information recording to be performed at a high recording density, the semiconductor laser devices for the optical recording media described above tend to be designed so as to produce laser beams having short wavelengths (e.g., wavelengths of at most 700 nm), which wavelengths are appropriate as the wavelengths of the stimulating rays for the stimulable phosphor sheets. As the semiconductor laser devices to be used as the stimulating ray sources in the radiation image read-out apparatuses, the semiconductor laser devices, which are capable of producing the laser beams having the wavelengths appropriate as the wavelengths of the stimulating rays for the stimulable phosphor sheets, are selected from the semiconductor laser devices described above.

Figure 4:
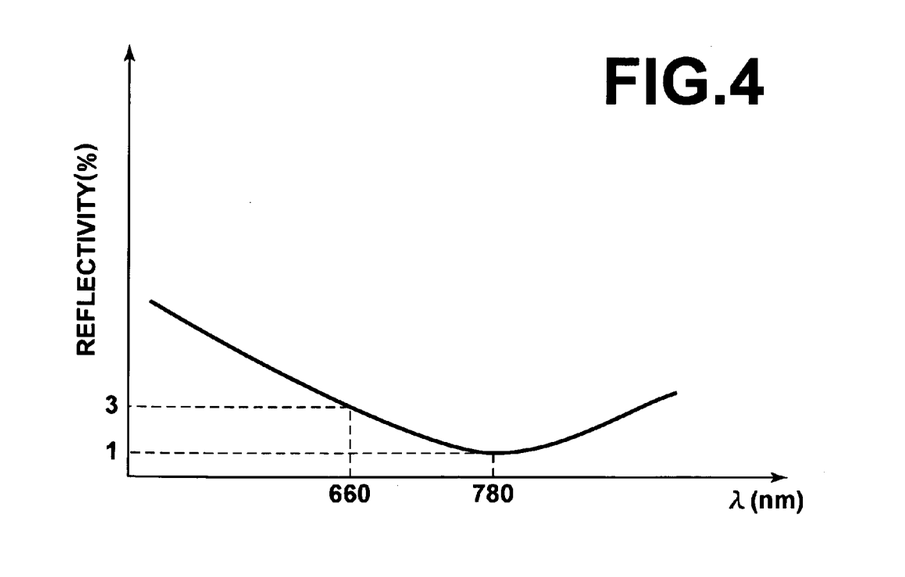
FIG. 4 is a graph showing characteristics of an anti-reflection film.

The anti-reflection film, which has been coated on each of the radiating windows of the semiconductor laser devices utilized in the recording apparatuses and the reproducing apparatuses for the optical recording media described above, has the anti-reflection effects with respect to the laser beams having wavelengths falling within a wide wavelength range. However, the anti-reflection film, which has been coated on each of the radiating windows of the semiconductor laser devices utilized in the recording apparatuses and the reproducing apparatuses for the optical recording media, does not have uniform anti-reflection effects with respect to all of the laser beams having various different wavelengths. FIG. 4 is a graph showing characteristics of an example of an anti-reflection film having been coated on a radiating window of a semiconductor laser device of the type described above. As illustrated in FIG. 4, the anti-reflection film has low reflectivities with respect to laser beams having wavelengths falling within a range of approximately 400 nm to approximately 900 nm. The anti-reflection film has the lowest reflectivity of approximately 1% with respect to the laser beam having a wavelength of 780 nm. However, the anti-reflection film has the reflectivities of as high as several percent with respect to the laser beams having other wavelengths. For example, with respect to the laser beam having a wavelength of 660 nm, the anti-reflection film has the reflectivity of as high as approximately 3%.

Figure 5A:
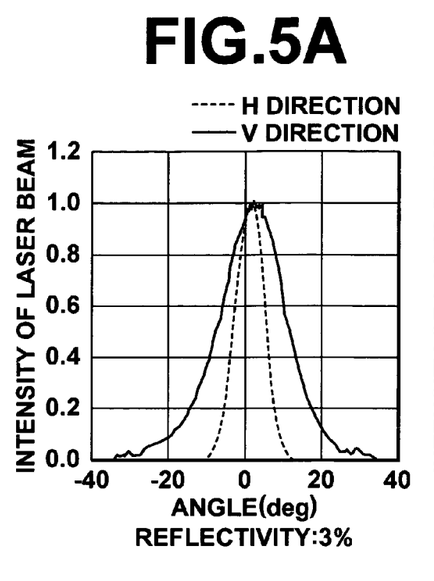
FIGS. 5A, 5B, 5C, and 5D are graphs showing effects of reflectivities of anti-reflection films, which have been coated on surfaces of radiating windows of semiconductor laser devices, upon FFP's of laser beams having been produced by semiconductor laser chips of the semiconductor laser devices.
Figure 5B:
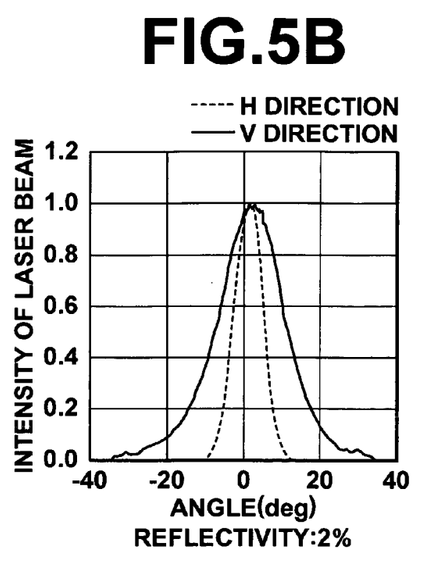
Figure 5C:
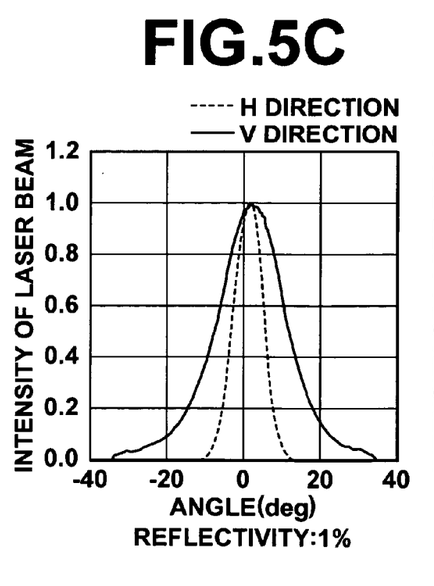
Figure 5D:
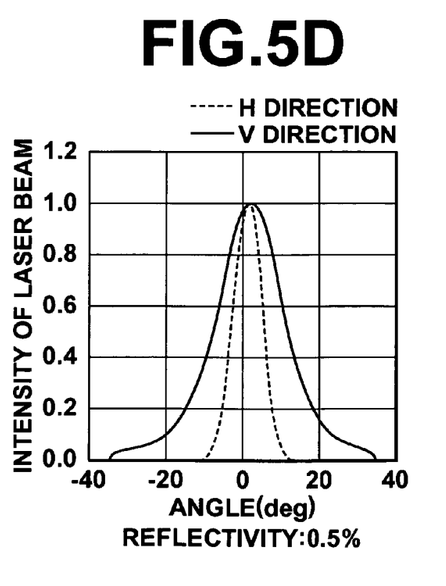

FIG. 5A is a graph showing a far field pattern (FFP) of a laser beam having been produced by a semiconductor laser chip, which FFP is obtained in cases where an anti-reflection film having been coated on a radiating window of a semiconductor laser device has a reflectivity of 3% with respect to the laser beam having been produced by the semiconductor laser chip. The FFP illustrated in FIG. 5A has been obtained from measurement made at a temperature of 20° C. Approximately identical measurement results have also been obtained from measurements made at different temperatures, e.g. 50° C.

In FIG. 5A, the solid line indicates the FFP in a maximum radius direction of a cross-section of the laser beam having been produced by the semiconductor laser chip, which cross-section is normal to the laser beam radiating direction. (The maximum radius direction of the cross-section of the laser beam will hereinbelow be referred to as the V direction.) Also, in FIG. 5A, the broken line indicates the FFP in a direction, which is normal to the maximum radius direction, i.e. the V direction, of the cross-section of the laser beam. (The direction, which is normal to the maximum radius direction, i.e. the V direction, of the cross-section of the laser beam, will hereinbelow be referred to as the H direction.) As illustrated in FIG. 5A, in the H direction, little disturbance occurs with the distribution of the intensity of the laser beam. However, in the V direction, a disturbance occurs with the distribution of the intensity of the laser beam, and the profile of the laser beam is deformed. The disturbance of the distribution of the intensity of the laser beam occurs due to interference, which occurs at the entry surface and the radiating surface of the radiating window due to reflection from the anti-reflection film, and return light toward the semiconductor laser chip.

In the cases of the recording apparatuses and the reproducing apparatuses for the optical recording media, slight deformation of the profile of the laser beam has little adverse effect upon the information recording and the information reproduction. Also, in the cases of the point scanning types of the radiation image read-out apparatuses, slight deformation of the profile of the laser beam has little adverse effect upon the radiation image read-out operation. However, in the cases of the line scanning types of the radiation image read-out apparatuses, in which the semiconductor laser devices described above are utilized as the stimulating ray sources, the laser beam having been produced as the stimulating rays by the semiconductor laser device is expanded into a linear laser beam extending in the main scanning direction. Therefore, in cases where the profile of the laser beam is deformed in the V direction described above, the distribution of the intensity of the stimulating rays in the main scanning direction on the stimulable phosphor sheet becomes nonuniform. As a result, the problems occur in that defects in image quality, such as vertical streak-like nonuniformity, arise in the radiation image reproduced from the image signal obtained from the radiation image read-out operation.

Also, in cases where the shading compensation is to be performed in order to compensate for nonuniformity in intensity of the stimulating rays irradiated to the stimulable phosphor sheet along the main scanning direction, it is necessary for the shading compensation signal to be formed. Such that good results of compensation may be obtained by suppressing adverse effects of variations with the passage of time, it is necessary for the shading compensation signal to be updated immediately before the image read-out operation is performed. However, currently, in order for the shading compensation signal to be updated, it is necessary to perform the operation for uniformly irradiating the radiation to the stimulable phosphor sheet. Therefore, ordinarily, the updating of the shading compensation signal is performed by experts only at the time of limited occasions, such as delivery of the radiation image read-out apparatuses from factories, changeover of apparatus members (e.g., a scanner head), or changeover of the stimulable phosphor sheets. Accordingly, currently, with the technique for performing the shading compensation, it is not always possible to cope with variations with the passage of time.

SUMMARY OF THE INVENTION

The primary object of the present invention is to provide a semiconductor laser device, which is capable of reliably preventing problems from occurring in that image quality of a radiation image obtained from a line scanning type of image read-out operation for reading out a radiation image having been stored on a stimulable phosphor sheet becomes bad.

Another object of the present invention is to provide a radiation image read-out method, which is capable of reliably preventing problems from occurring in that image quality of a radiation image obtained from a line scanning type of image read-out operation for reading out a radiation image having been stored on a stimulable phosphor sheet becomes bad.

The specific object of the present invention is to provide an apparatus for carrying out the radiation image read-out method.

The present invention provides a semiconductor laser device for producing a laser beam, which is adapted to be expanded into a linear laser beam for use as stimulating rays for an image read-out operation for reading out a radiation image having been stored on a stimulable phosphor sheet, the semiconductor laser device comprising:

i) a semiconductor laser chip for producing the laser beam, ii) a package for accommodating the semiconductor laser chip therein, and iii) a radiating window, which is fitted to the package and allows the laser beam having been produced by the semiconductor laser chip to pass therethrough, an anti-reflection film being coated on a surface of the radiating window, the anti-reflection film having a reflectivity of at most 1.0% with respect to a wavelength of the laser beam having been produced by the semiconductor laser chip.

The semiconductor laser device in accordance with the present invention is adapted for use as a stimulating ray source for producing the stimulating rays to be used for a line scanning type of image read-out operation for reading out a radiation image having been stored on a stimulable phosphor sheet. The semiconductor laser device in accordance with the present invention is adapted to produce the laser beam having a wavelength falling within a wavelength range appropriate for stimulation of the stimulable phosphor sheet. The wavelength range appropriate for the stimulation of the stimulable phosphor sheet varies for different stimulable phosphor sheets. Ordinarily, the wavelength range appropriate for the stimulation of the stimulable phosphor sheet is the range of 500 nm to 800 nm and is particularly the range of 600 nm to 700 nm.

In the semiconductor laser device in accordance with the present invention, the package is constituted to accommodate the semiconductor laser chip therein and need not necessarily be constituted to seal the semiconductor laser chip therein tightly. However, from the viewpoint of elimination of adverse effects of ambient air, prevention of entry of dust, safety, and the like, the package should preferably be constituted to seal the semiconductor laser chip therein tightly.

FIGS. 5A, 5B, 5C, and 5D show the results of measurements having been made with respect to effects of reflectivities of anti-reflection films, which have been coated on surfaces of radiating windows of semiconductor laser devices, upon the FFP's of laser beams having been produced by semiconductor laser chips of the semiconductor laser devices. As illustrated in each of FIGS. 5A and 5B, in cases where the reflectivity of the anti-reflection film with respect to the wavelength of the produced laser beam is 3% as in FIG. 5A or 2% as in FIG. 5B, a disturbance occurs with the FFP of the laser beam in the V direction. However, in cases where the reflectivity of the anti-reflection film with respect to the wavelength of the produced laser beam is at most 1.0%, e.g. in cases where the reflectivity of the anti-reflection film with respect to the wavelength of the produced laser beam is 1.0% as in FIG. 5C or 0.5% as in FIG. 5D, a disturbance does not occur with the FFP of the laser beam in the H direction and with the FFP of the laser beam in the V direction. With the semiconductor laser device in accordance with the present invention, on the basis of the findings described above, the reflectivity of the anti-reflection film, which is coated on the radiating window of the semiconductor laser device, with respect to the wavelength of the laser beam having been produced by the semiconductor laser chip is restricted to be at most 1.0%, and the profile of the laser beam is thereby prevented from being deformed.

The present invention also provides a radiation image read-out method, comprising the steps of:

i) irradiating stimulating rays, which have been produced by a line light source, linearly along a main scanning direction and onto an area of a surface of a stimulable phosphor sheet, on which a radiation image has been stored, the stimulating rays causing the stimulable phosphor sheet to emit light in proportion to an amount of energy stored on the stimulable phosphor sheet during exposure of the stimulable phosphor sheet to radiation, ii) receiving light, which is emitted from the linear area of the stimulable phosphor sheet exposed to the linear stimulating rays, with a line sensor comprising a plurality of photoelectric conversion devices arrayed along the main scanning direction, the received light being subjected to photoelectric conversion performed by the line sensor, iii) moving the stimulable phosphor sheet with respect to the line light source and the line sensor and in a sub-scanning direction different from the main scanning direction, and iv) successively reading outputs from the photoelectric conversion devices of the line sensor, which outputs are obtained at respective positions of movement, in accordance with the movement, whereby an operation for reading out the radiation image from the stimulable phosphor sheet is performed, wherein the line light source comprises a semiconductor laser device and an optical system for expanding the laser beam, which has been radiated out from the semiconductor laser device, into a linear laser beam acting as the linear stimulating rays and extending in the main scanning direction, and the semiconductor laser device comprises:

a) a semiconductor laser chip for producing the laser beam, b) a package for accommodating the semiconductor laser chip therein, and c) a radiating window, which is fitted to the package and allows the laser beam having been produced by the semiconductor laser chip to pass therethrough, an anti-reflection film being coated on a surface of the radiating window, the anti-reflection film having a reflectivity of at most 1.0% with respect to a wavelength of the laser beam having been produced by the semiconductor laser chip.

The present invention further provides an apparatus for carrying out the radiation image read-out method in accordance with the present invention. Specifically, the present invention further provides a radiation image read-out apparatus, comprising:

i) a line light source for irradiating stimulating rays linearly along a main scanning direction and onto an area of a surface of a stimulable phosphor sheet, on which a radiation image has been stored, the stimulating rays causing the stimulable phosphor sheet to emit light in proportion to an amount of energy stored on the stimulable phosphor sheet during exposure of the stimulable phosphor sheet to radiation, ii) a line sensor for receiving light, which is emitted from the linear area of the stimulable phosphor sheet exposed to the linear stimulating rays, and performing photoelectric conversion of the received light, the line sensor comprising a plurality of photoelectric conversion devices arrayed along the main scanning direction, iii) scanning means for moving the stimulable phosphor sheet with respect to the line light source and the line sensor and in a sub-scanning direction different from the main scanning direction, and iv) reading means for successively reading outputs from the photoelectric conversion devices of the line sensor, which outputs are obtained at respective positions of movement performed by the scanning means, in accordance with the movement, wherein the line light source comprises a semiconductor laser device and an optical system for expanding the laser beam, which has been radiated out from the semiconductor laser device, into a linear laser beam acting as the linear stimulating rays and extending in the main scanning direction, and the semiconductor laser device comprises:

a) a semiconductor laser chip for producing the laser beam, b) a package for accommodating the semiconductor laser chip therein, and c) a radiating window, which is fitted to the package and allows the laser beam having been produced by the semiconductor laser chip to pass therethrough, an anti-reflection film being coated on a surface of the radiating window, the anti-reflection film having a reflectivity of at most 1.0% with respect to a wavelength of the laser beam having been produced by the semiconductor laser chip.

With the radiation image read-out method and apparatus in accordance with the present invention, the laser beam having been radiated out from the semiconductor laser device in accordance with the present invention is expanded by the optical system into the linear laser beam extending along the main scanning direction, and the radiation image having been stored on the stimulable phosphor sheet is read out with the line scanning type of the image read-out operation.

As will be understood from the specification, it should be noted that the term "moving a stimulable phosphor sheet with respect to a line light source and a line sensor" as used herein means movement of the stimulable phosphor sheet relative to the line light source and the line sensor, and embraces the cases wherein the stimulable phosphor sheet is moved while the line light source and the line sensor are kept stationary, the cases wherein the line light source and the line sensor are moved while the stimulable phosphor sheet is kept stationary, and the cases wherein both the stimulable phosphor sheet and the line light source and the line sensor are moved. In cases where the line light source and the line sensor are moved, they should be moved together with each other.

In the radiation image read-out method and apparatus in accordance with the present invention, by the scanning means, the stimulable phosphor sheet is moved with respect to the line light source and the line sensor and in the sub-scanning direction different from the main scanning direction. The direction along which the stimulable phosphor sheet is moved with respect to the line light source and the line sensor (i.e., the direction different from the main scanning direction) should preferably be the direction approximately normal to the main scanning direction. However, the direction along which the stimulable phosphor sheet is moved with respect to the line light source and the line sensor is not limited to the direction normal to the main scanning direction. For example, alternatively, the stimulable phosphor sheet may be moved with respect to the line light source and the line sensor along an oblique direction with respect to the direction approximately normal to the main scanning direction, such that approximately the entire surface of the stimulable phosphor sheet may be uniformly exposed to the stimulating rays. As another alternative, the stimulable phosphor sheet may be moved with respect to the line light source and the line sensor along a zigzag movement direction, such that approximately the entire surface of the stimulable phosphor sheet maybe uniformly exposed to the stimulating rays.

Also, in the radiation image read-out method and apparatus in accordance with the present invention, the line light source and the line sensor may be located on the same surface side of the stimulable phosphor sheet. Alternatively, the line light source and the line sensor maybe located on opposite surface sides of the stimulable phosphor sheet. In cases where the line light source and the line sensor are located on the opposite surface sides of the stimulable phosphor sheet, the substrate of the stimulable phosphor sheet, or the like, should be formed from a material having transmissivity to the emitted light, such that the emitted light may be transmitted to the surface side of the stimulable phosphor sheet, which surface side is opposite to the surface on the stimulating ray incidence side.

As the line sensor, an amorphous silicon sensor, a CCD image sensor, a CCD image sensor with back illuminator, a MOS image sensor, or the like, may be employed.

Further, the photoelectric conversion devices constituting the line sensor may be arrayed in a row. Alternatively, the photoelectric conversion devices constituting the line sensor may be arrayed in a plurality of rows extending along the longitudinal direction of the line sensor (which longitudinal direction corresponds to the main scanning direction on the stimulable phosphor sheet). As another alternative, the photoelectric conversion devices constituting the line sensor may be arrayed in a zigzag pattern.

Furthermore, in the radiation image read-out method and apparatus in accordance with the present invention, the line light source may comprise only one semiconductor laser device. Alternatively, the line light source may comprise a plurality of semiconductor laser devices, and the laser beam having been radiated out from each of the semiconductor laser devices may be expanded into the linear laser beam extending along the main scanning direction on the stimulable phosphor sheet. In such cases, it is necessary for the semiconductor laser devices to be located such that adjacent linear laser beams obtained from the semiconductor laser devices may overlap each other, and such that the intensity of the stimulating rays may become approximately uniform in the area of the stimulable phosphor sheet exposed to the stimulating rays.

With the semiconductor laser device in accordance with the present invention and the radiation image read-out method and apparatus in accordance with the present invention, wherein the semiconductor laser device is utilized as the line light source, the reflectivity of the anti-reflection film, which has been coated on the radiating window of the semiconductor laser device, with respect to the wavelength of the laser beam, which has been produced by the semiconductor laser chip of the semiconductor laser device, is set to be at most 1.0%. Therefore, the occurrent of return light from the radiating window toward the semiconductor laser chip and the occurrence of interference at an entry surface and a radiating surface of the radiating window are capable of being suppressed. Accordingly, the profile of the laser beam is capable of being prevented from being deformed. As a result, nonuniformity in intensity of the stimulating rays irradiated to the stimulable phosphor sheet along the main scanning direction is capable of being suppressed. Also, the problems are capable of being prevented from occurring in that vertical streak-like nonuniformity arises in the radiation image reproduced from the image signal obtained from the radiation image read-out operation. The effects described above have been confirmed with various experiments conducted by the inventors.

Further, with the semiconductor laser device in accordance with the present invention and the radiation image read-out method and apparatus in accordance with the present invention, instead of the shading compensation being performed on the image signal obtained from the radiation image read-out operation, the nonuniformity in intensity of the stimulating rays irradiated to the stimulable phosphor sheet along the main scanning direction is suppressed. Therefore, a particular operation for, for example, updating the shading compensation signal immediately before the image read-out operation is performed need not be performed, and a radiation image having good image quality is capable of being obtained reliably from the image read-out operation.

DESCRIPTION OF THE PREFERRED EMBODIMENTS

The present invention will hereinbelow be described in further detail with reference to the accompanying drawings.

Figure 1:
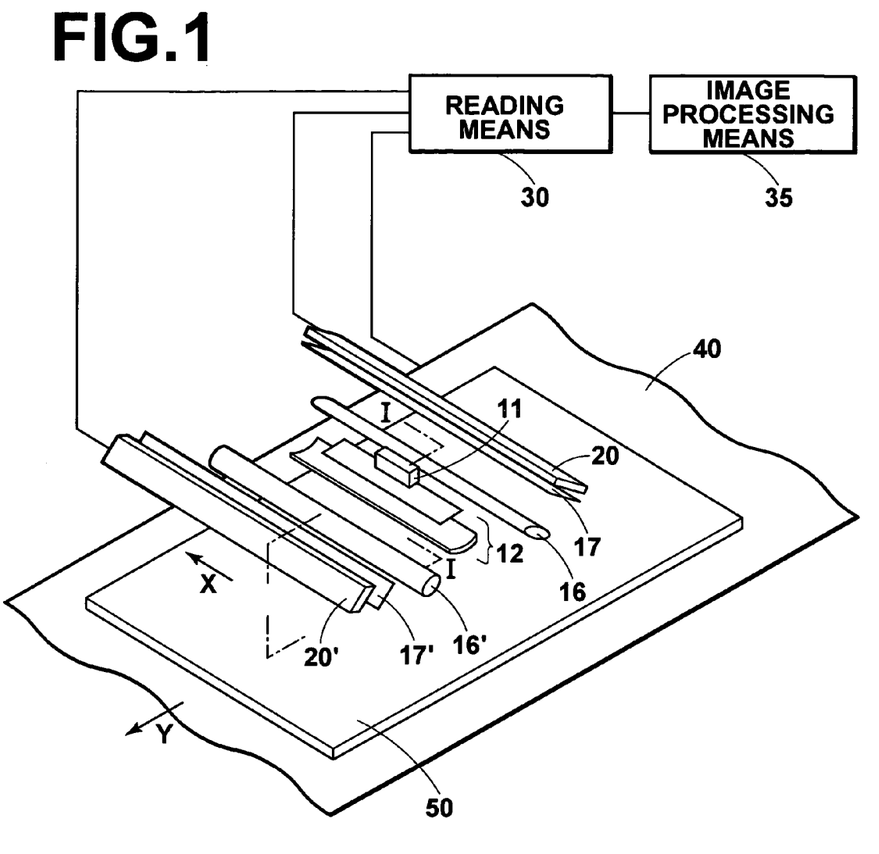
FIG. 1 is a schematic view showing an embodiment of the radiation image read-out apparatus in accordance with the present invention.
Figure 2:
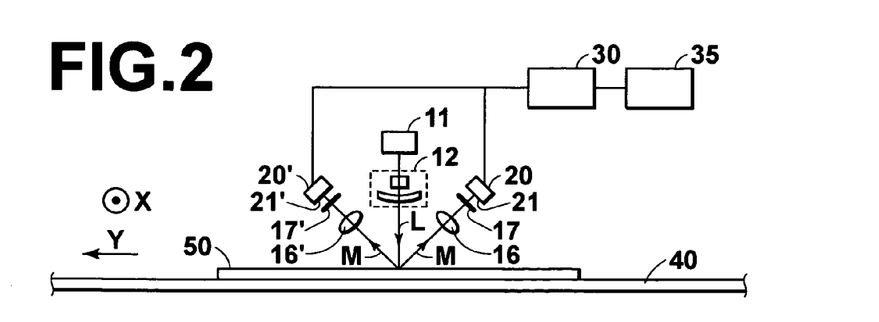
FIG. 2 is a sectional view taken on line I—I of FIG. 1.
Figure 3:
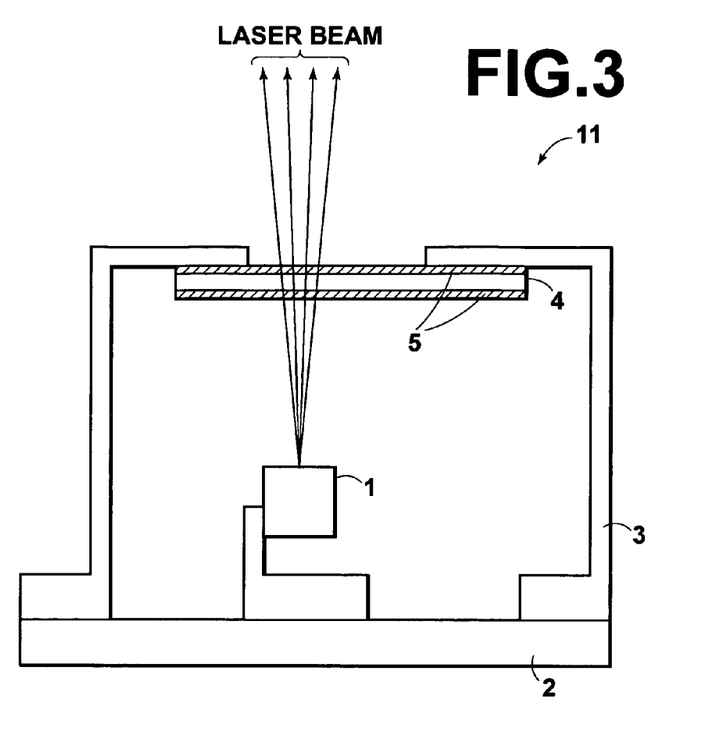
FIG. 3 is a sectional view showing a semiconductor laser device employed in the embodiment of the radiation image read-out apparatus shown in FIG. 1.

FIG. 1 is a schematic view showing an embodiment of the radiation image read-out apparatus in accordance with the present invention. FIG. 2 is a sectional view taken on line I—I of FIG. 1. FIG. 3 is a sectional view showing a semiconductor laser device employed in the embodiment of the radiation image read-out apparatus shown in FIG. 1.

As illustrated in FIG. 1, this embodiment of the radiation image read-out apparatus in accordance with the present invention comprises a scanning belt 40 for supporting a stimulable phosphor sheet 50, on which a radiation image has been stored. The scanning belt 40 conveys the stimulable phosphor sheet 50 in the direction indicated by the arrow Y (i.e., a sub-scanning direction) The radiation image read-out apparatus also comprises a semiconductor laser device 11 for radiating out a laser beam acting as stimulating rays L. The laser beam is radiated out in the direction normal to the surface of the stimulable phosphor sheet 50. The radiation image read-out apparatus further comprises an optical system 12, which is constituted of a combination of a collimator lens for collimating the laser beam having been radiated out of the semiconductor laser device 11 and a toric lens for expanding the laser beam only in one direction. The optical system 12 converts the laser beam into the linear stimulating rays L extending in the direction indicated by the arrow X (i.e., the main scanning direction) on the stimulable phosphor sheet 50. The radiation image read-out apparatus still further comprises a distributed index lens array (constituted of an array of a plurality of distributed index lenses and hereinbelow referred to as the SELFOC lens array) 16. The SELFOC lens array 16 collimates light M, which is emitted by the stimulable phosphor sheet 50 exposed to the linear stimulating rays L and which carries the radiation image information having been stored on the stimulable phosphor sheet 50. The light M, which has been collimated by the SELFOC lens array 16, travels toward a line sensor 20, which will be described later. The radiation image read-out apparatus also comprises a stimulating ray cut-off filter 17 for transmitting only the emitted light M and filtering out the stimulating rays L, which have been reflected from the surface of the stimulable phosphor sheet 50 and which are mixed slightly in the emitted light M having passed through the SELFOC lens array 16. The radiation image read-out apparatus further comprises the line sensor 20 for receiving the emitted light M having passed through the stimulating ray cut-off filter 17 and for photoelectrically converting the emitted light M.

The radiation image read-out apparatus still further comprises a distributed index lens array (constituted of an array of a plurality of distributed index lenses and hereinbelow referred to as the SELFOC lens array) 16'. The SELFOC lens array 16' collimates the light M, which is emitted by the stimulable phosphor sheet 50 exposed to the linear stimulating rays L and which carries the radiation image information having been stored on the stimulable phosphor sheet 50. The light M, which has been collimated by the SELFOC lens array 16', travels toward a line sensor 20', which will be described later. The radiation image read-out apparatus also comprises a stimulating ray cut-off filter 17' for transmitting only the emitted light M and filtering out the stimulating rays L, which have been reflected from the surface of the stimulable phosphor sheet 50 and which are mixed slightly in the emitted light M having passed through the SELFOC lens array 16'. The radiation image read-out apparatus further comprises the line sensor 20' for receiving the emitted light M having passed through the stimulating ray cut-off filter 17' and for photoelectrically converting the emitted light M.

The radiation image read-out apparatus still further comprises reading means 30 for reading signal components, which have been outputted from the line sensor 20 and the line sensor 20', and obtaining an image signal. The radiation image read-out apparatus also comprises image processing means 35 for performing image processing, such as gradation processing and processing in the frequency domain, on the image, which is represented by the image signal having been obtained from the reading means 30. The image processing means 35 thus obtains an image for diagnosis, or the like, which has good image quality and is capable of serving as an effective tool in, particularly, the efficient and accurate diagnosis of an illness.

In the constitution described above, the SELFOC lens array 16 and the stimulating ray cut-off filter 17 are located such that the light M, which has been emitted from the stimulable phosphor sheet 50 when the stimulable phosphor sheet 50 is exposed to the linear stimulating rays L, may be received by the line sensor 20. Also, the SELFOC lens array 16' and the stimulating ray cut-off filter 17' are located such that the light M, which has been emitted from the stimulable phosphor sheet 50 when the stimulable phosphor sheet 50 is exposed to the linear stimulating rays L, may be received by the line sensor 20'.

The line sensor 20 comprises a plurality of photoelectric conversion devices 21, 21, . . . , which are arrayed along the direction indicated by the arrow X. Also, the line sensor 20' comprises a plurality of photoelectric conversion devices 21', 21', . . . , which are arrayed along the direction indicated by the arrow X. As each of the line sensor 20 and the line sensor 20', an amorphous silicon sensor, a CCD image sensor, a MOS image sensor, or the like, may be employed.

The reading means 30 converts the output signal components, which have been obtained from the line sensor 20 and the line sensor 20', into pixel signal components. The reading means 30 also performs processing for consolidating the pixel signal components having been obtained from the line sensor 20 and the line sensor 20'. The reading means 30 may also be provided with compensation means for making compensation, such as dark current compensation and sensitivity compensation, in accordance with the characteristics of the line sensor 20 and the line sensor 20'.

Further, each of the line sensor 20 and the line sensor 201 should preferably be located in a direction, which is as normal to the stimulating ray-irradiated area of the stimulable phosphor sheet 50 as possible.

Furthermore, the direction from which the linear stimulating rays L are irradiated need not necessarily be the direction approximately normal to the stimulable phosphor sheet 50 as in the embodiment of FIG. 1. In cases where the direction from which the linear stimulating rays L are irradiated is set at a direction other than the direction approximately normal to the stimulable phosphor sheet 50, the optical system 12, the line sensor 20, and the line sensor 20' should preferably be located with the light collecting efficiency being taken into consideration.

FIG. 3 is a sectional view showing the semiconductor laser device 11 employed as the stimulating ray source in the embodiment of the radiation image read-out apparatus shown in FIG. 1. In FIG. 3 and in the explanation of the semiconductor laser device 11 made with reference to FIG. 3, an electric power supplying section, an electric circuit, and the like, are omitted for clearness.

As illustrated in FIG. 3, the semiconductor laser device 11 comprises a semiconductor laser chip 1 for producing the laser beam, which has a wavelength of 660 nm appropriate as the stimulating rays for the stimulable phosphor sheet 50. The semiconductor laser device 11 also comprises a casing 2 and a cap 3. The casing 2 and the cap 3 are located so as to seal the semiconductor laser chip 1 tightly. An area of the cap 3 is located at the path of the laser beam radiated out from the semiconductor laser chip 1, and a radiating window 4 constituted of a window glass is formed at the aforesaid area of the cap 3. The radiating window 4 has an entry surface, through which the laser beam having been produced by the semiconductor laser chip 1 enters into the radiating window 4, and a radiating surface, through which the laser beam is radiated out. An anti-reflection film 5 is coated on the side of the entry surface of the radiating window 4, which side stands facing the semiconductor laser chip 1.

Also, an anti-reflection film 5 is coated on the side of the radiating surface of the radiating window 4, which side stands facing the semiconductor laser chip 1.

How the aforesaid embodiment of the radiation image read-out apparatus in accordance with the present invention operates will be described hereinbelow.

Firstly, the scanning belt 40 moves in the direction indicated by the arrow Y (i.e., in the sub-scanning direction), and the stimulable phosphor sheet 50, on which the radiation image has been stored and which is supported on the scanning belt 40, is conveyed in the direction indicated by the arrow Y. The conveyance speed of the stimulable phosphor sheet 50 is equal to the movement speed of the scanning belt 40. Information representing the movement speed of the scanning belt 40 is fed into the reading means 30.

Also, the semiconductor laser device 11 produces and radiates out the laser beam, which acts as the stimulating rays L, in the direction approximately normal to the surface of the stimulable phosphor sheet 50. The laser beam having been radiated out from the semiconductor laser device 11 is collimated and expanded into the linear stimulating rays L by the optical system 12, which is constituted of the collimator lens and the toric lens and is located in the optical path of the laser beam. The linear stimulating rays L, which extend along the direction indicated by the arrow X (i.e., along the main scanning direction), impinge upon the stimulable phosphor sheet 50 from the direction approximately normal to the surface of the stimulable phosphor sheet 50.

When the linear stimulating rays L impinge upon an area of the stimulable phosphor sheet 50, the linear stimulating rays L stimulate the stimulable phosphor contained in the exposed area of the stimulable phosphor sheet 50. Also, the stimulating rays L enter from the exposed area of the stimulable phosphor sheet 50 into the internal region of the stimulable phosphor sheet 50 and diffuse to the areas neighboring with the exposed area. Thus the stimulating rays L also stimulate the stimulable phosphor contained in the areas neighboring with the exposed area of the stimulable phosphor sheet 50. As a result, the emitted light M having an intensity in accordance with the image information stored on the stimulable phosphor sheet 50 emanates from the area containing the exposed area and the neighboring areas.

The emitted light M is collimated by the SELFOC lens array 16 and is collected onto the line sensor 20. At this time, in cases where the stimulating rays L, which have been reflected from the surface of the stimulable phosphor sheet 50, are mixed slightly in the emitted light M having passed through the SELFOC lens array 16, the stimulating rays L are filtered out by the stimulating ray cut-off filter 17. Therefore, the stimulating rays L do not impinge upon the surface of the line sensor 20. The emitted light M is photoelectrically converged by the photoelectric conversion devices of the line sensor 20, which photoelectric conversion devices are arrayed along the direction indicated by the arrow X. The output signal components having thus been obtained from the line sensor 20 are fed into the reading means 30.

Also, the emitted light M is collimated by the SELFOC lens array 16' and is collected onto the line sensor 20'. At this time, in cases where the stimulating rays L, which have been reflected from the surface of the stimulable phosphor sheet 50, are mixed slightly in the emitted light M having passed through the SELFOC lens array 16', the stimulating rays L are filtered out by the stimulating ray cut-off filter 17'. Therefore, the stimulating rays L do not impinge upon the surface of the line sensor 20'. The emitted light M is photoelectrically converged by the photoelectric conversion devices of the line sensor 20', which photoelectric conversion devices are arrayed along the direction indicated by the arrow X. The output signal components having thus been obtained from the line sensor 20' are fed into the reading means 30.

The reading means 30 converts the output signal components, which have been obtained from the line sensor 20 and the line sensor 20', into the pixel signal components. Also, the reading means 30 performs, for example, the processing for consolidating the pixel signal components, which have been obtained from the conversion of the output signal components received from the line sensor 20 and the line sensor 20', and which correspond to an identical site on the stimulable phosphor sheet 50. The reading means 30 thereby obtains an image signal, which represents the radiation image having been stored on the stimulable phosphor sheet 50.

The image processing means 35 performs the image processing, such as the gradation processing and the processing in the frequency domain, on the image, which is represented by the image signal having been obtained from the reading means 30. The image processing means 35 thus obtains the image for diagnosis, or the like, which has good image quality and is capable of serving as an effective tool in, particularly, the efficient and accurate diagnosis of an illness.

In the semiconductor laser device 11 of the aforesaid embodiment of the radiation image read-out apparatus in accordance with the present invention, as the semiconductor laser chip 1, the semiconductor laser chip for producing the laser beam having the wavelength of 660 nm, which laser beam is often utilized for the recording apparatuses and the reproducing apparatuses for optical recording media, such as DVD's, is employed. Also, the anti-reflection films 5, 5 coated on the radiating window 4 has the reflectivity of 1.0% with respect to the wavelength of 660 nm of the laser beam having been produced by the semiconductor laser chip 1. Experiments conducted by the inventors revealed that, with the embodiment of the radiation image read-out apparatus illustrated in FIG. 1, in which the semiconductor laser device 11 is employed as the stimulating ray source, vertical steak-like nonuniformity does not arise in the image obtained from the operation for reading out the radiation image from the stimulable phosphor sheet 50, and the radiation image having good image quality is capable of being obtained. The effects described above are capable of being obtained since, in cases where the reflectivity of the anti-reflection film having been coated on the radiating window of the semiconductor laser device is restricted to be 1.0% with respect to the wavelength of the produced laser beam, the profile of the laser beam is capable of being prevented from being deformed, and the nonuniformity in distribution of intensity of the stimulating rays along the main scanning direction on the stimulable phosphor sheet 50 is capable of being suppressed.

Also, since the nonuniformity in distribution of intensity of the stimulating rays along the main scanning direction is capable of being suppressed, a burden to the shading compensation made on the image signal having been obtained from the image read-out operation is capable of being kept light, and a particular operation for, for example, updating the shading compensation signal need not be performed.

The semiconductor laser device in accordance with the present invention and the radiation image read-out apparatus in accordance with the present invention are not limited to the embodiment described above and may be embodied in various ways.

For example, in the embodiment of the radiation image read-out apparatus illustrated in FIG. 1, the detection of the light M emitted by the stimulable phosphor sheet 50 is performed with the two line sensors 20 and 20'. Alternatively, the detection of the light M emitted by the stimulable phosphor sheet 50 may be performed with only one line sensor. As another alternative, the detection of the light M emitted by the stimulable phosphor sheet 50 maybe performed with at least three line sensors. Also, in cases where the plurality of the line sensors are utilized, the plurality of the line sensors need not necessarily be located on the same surface side of the stimulable phosphor sheet 50 as in the embodiment of FIG. 1 and may be located on opposite surface sides of the stimulable phosphor sheet 50.

Further, in the embodiment of the radiation image read-out apparatus illustrated in FIG. 1, the image read-out operation is performed by use of the line sensors 20, 20', each of which has a detection range coinciding with the length of the linear stimulating rays L, the length being taken with respect to the main scanning direction on the stimulable phosphor sheet 50. Alternatively, a plurality of line sensors, each of which has a detection range shorter than the length of the linear stimulating rays L, may be arrayed along the main scanning direction, such that the total sum of the detection ranges of the plurality of the line sensors coincides with the length of the linear stimulating rays L. In such cases, the joining section between adjacent line sensors does not have a photoelectric conversion device, and a signal component corresponding to the site on the stimulable phosphor sheet 50, which site corresponds to the joining section between the adjacent line sensors is not capable of being obtained. Therefore, in such cases, the reading means 30 should preferably perform processing for making up the signal component with an interpolating operation, or the like.

Furthermore, in the embodiment of the radiation image read-out apparatus illustrated in FIG. 1, only one semiconductor laser device 11 is utilized as the stimulating ray source. Alternatively, a plurality of semiconductor laser devices may be utilized as the stimulating ray source. In such cases, the semiconductor laser devices and the optical systems for expanding the laser beams having been radiated out from the semiconductor laser devices should preferably be located such that the adjacent linear laser beams obtained from the semiconductor laser devices may overlap each other, and such that the intensity of the stimulating rays may become uniform along the main scanning direction on the stimulable phosphor sheet.

Also, in cases where the plurality of the semiconductor laser devices are utilized as the stimulating ray source, light blocking means, such as a slit member or a light blocking film, should preferably be located for the optical system, which is constituted of a lens or a lens combination and is located for each of the semiconductor laser devices, such that the stimulating rays passing through the areas outside of effective diameter of the optical system with respect to the main scanning direction.

What is claimed is:

1. A line light source for producing a laser beam, which is adapted to be expanded into a linear laser beam for use as stimulating rays for an image read-out operation for reading out a radiation image having been stored on a stimulable phosphor sheet, the line light source comprising:

i) a semiconductor laser chip for producing the laser beam,
ii) a package for accommodating the semiconductor laser chip therein,
iii) a radiating window, which is fitted to the package and allows the laser beam having been produced by the semiconductor laser chip to pass therethrough,
iv) an optical system, which expands the laser beam that has passed through the radiating window in a direction of a line sensor; and
v) an anti-reflection film being coated on a surface of the radiating window, the anti-reflection film having a reflectivity of at most 1.0% with respect to a wavelength of the laser beam having be en produced by the semiconductor laser chip,
wherein the anti-reflection film suppresses the non-uniformity in distribution of intensity of the laser light in the direction of the line sensor, which has passed through the optical system, and prevents the vertical streak-like non-uniformity in the image.

2. A line light source as defined in claim 1 wherein the wavelength of the laser beam having been produced by the semiconductor laser chip falls within the range of 500 nm to 800 nm.

3. A line light source as defined in claim 1 wherein the package is constituted to seal the semiconductor laser chip therein tightly.

4. A radiation image read-out method, comprising:
irradiating stimulating rays, which have been produced from a line light source, linearly along a main scanning direction and onto an area of a surface of a stimulable phosphor sheet on which a radiation image has been stored, the stimulating rays causing the stimulable phosphor sheet to emit light in proportion to an amount of energy stored on the stimulable phosphor sheet during exposure of the stimulable phosphor sheet to radiation,
receiving light, which is emitted from the linear area of the stimulable phosphor sheet exposed to the linear stimulating rays, with a line sensor comprising a plurality of photoelectric conversion devices arrayed along the main scanning direction, the received light being subjected to photoelectric conversion performed by the line sensor, wherein the receiving light is received by a plurality of line sensors disposed on the same side of the stimulable phosphor sheet,
moving the stimulable phosphor sheet with respect to the line light source and the line sensor and in a sub-scanning direction different from the main scanning direction, and
successively reading outputs from the photoelectric conversion devices of the line sensor, which outputs are obtained at respective positions of movement, in accordance with the movement, whereby an operation for reading out the radiation image from the stimulable phosphor sheet is performed,
wherein the line light source comprises a semiconductor laser device and an optical system for expanding a laser beam, which has been radiated out from the semiconductor laser device, into a linear laser beam acting as the linear stimulating rays and extending in the main scanning direction, and
the semiconductor laser device comprises:
a semiconductor laser chip for producing the laser beam,
a package for accommodating the semiconductor laser chip therein,
a radiating window, which is fitted to the package and allows the laser beam having been produced by the semiconductor laser chip to pass therethrough, and
an anti-reflection film being coated on a surface of the radiating window, the anti-reflection film having a reflectivity of at most 1.0% with respect to a wavelength of the laser beam having been produced by the semiconductor laser chip;
wherein the anti-reflection film suppresses the non-uniformity in distribution of intensity of the laser light in the direction of the line sensor, which has passed through the optical system, and prevents the vertical streak-like non-uniformity in the image.

5. A radiation image read-out method as defined in claim 4 wherein the wavelength of the laser beam having been produced by the semiconductor laser chip falls within the range of 500 nm to 800 nm.

6. A radiation image read-out method as defined in claim 4 wherein the package is constituted to seal the semiconductor laser chip therein tightly.

7. A radiation image read-out apparatus, comprising:
a line light source for irradiating stimulating rays linearly along a main scanning direction and onto an area of a surface of a stimulable phosphor sheet, on which a radiation image has been stored, the stimulating rays causing the stimulable phosphor sheet to emit light in proportion to an amount of energy stored on the stimulable phosphor sheet during exposure of the stimulable phosphor sheet to radiation,
a line sensor for receiving light, which is emitted from the linear area of the stimulable phosphor sheet exposed to the linear stimulating rays, and performing photoelectric conversion of the received light, the line sensor comprising a plurality of photoelectric conversion devices arrayed along the main scanning direction,
scanning means for moving the stimulable phosphor sheet with respect to the line light source and the line sensor and in a sub-scanning direction different from the main scanning direction,
reading means for successively reading outputs from the photoelectric conversion devices of the line sensor, which outputs are obtained at respective positions of movement performed by the scanning means, in accordance with the movement, wherein the reading means obtains an image signal from the outputs read by the reading means, and
an image processing means which performs image processing on the image signal obtained by the reading means;
wherein the line light source comprises a semiconductor laser device and an optical system for expanding a laser beam, which has been radiated out from the semiconductor laser device, into a linear laser beam acting as the linear stimulating rays and extending in the main scanning direction, and
the semiconductor laser device comprises:
a semiconductor laser chip for producing the laser beam,
a package for accommodating the semiconductor laser chip therein,
a radiating window, which is fitted to the package and allows the laser beam having been produced by the semiconductor laser chip to pass therethrough, and
an anti-reflection film being coated on a surface of the radiating window, the anti-reflection film having a reflectivity of at most 1.0% with respect to a wavelength of the laser beam having be en produced by the semiconductor laser chip;

wherein the anti-reflection film suppresses the non-uniformity in distribution of intensity of the laser light in the direction of the line sensor, which has passed through the optical system, and prevents the vertical streak-like non-uniformity in the image.

8. A radiation image read-out apparatus as defined in claim 7 wherein the wavelength of the laser beam having been produced by the semiconductor laser chip falls within the range of 500 nm to 800 nm.

9. A radiation image read-out apparatus as defined in claim 7, wherein the package is constituted to seal the semiconductor laser chip therein tightly.

10. A line light source as defined in claim 1, wherein the linear laser beam is used as stimulating rays for an image read-out operation for reading out a radiation image having been stored on a stimulating phosphor sheet.

11. A line light source as defined in claim 1, wherein the anti-reflection film is disposed on both surfaces of the radiating window.

12. A line light source as defined in claim 1, wherein a plurality of semiconductor laser chips are disposed in a direction of a line sensor array such that the laser light emitted by each of the plurality of laser chips is overlapped.

* * * * *